US012647507B2

(12) United States Patent
Deng et al.

(10) Patent No.: US 12,647,507 B2
(45) Date of Patent: Jun. 2, 2026

(54) HUMAN-COMPUTER INTERACTION INTERFACE CONTROL METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Ying Deng, Shenzhen (CN); Jiaqi Pan, Shenzhen (CN); Ke Mao, Shenzhen (CN); Xiaoqing Wen, Shenzhen (CN); Weixiang Yu, Shenzhen (CN); Jing Kou, Shenzhen (CN); Zefeng Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 699 days.

(21) Appl. No.: 17/950,311

(22) Filed: Sep. 22, 2022

(65) Prior Publication Data

US 2023/0014355 A1    Jan. 19, 2023

Related U.S. Application Data

(63) Continuation of application No. PCT/CN2021/131126, filed on Nov. 17, 2021.

(30) Foreign Application Priority Data

Dec. 18, 2020    (CN) .......................... 202011500679.2

(51) Int. Cl.
*H04M 1/72448*    (2021.01)
*G06F 1/16*    (2006.01)

(52) U.S. Cl.
CPC ...... *H04M 1/72448* (2021.01); *G06F 1/1626* (2013.01); *G06F 2200/1614* (2013.01); *G06F 2200/1637* (2013.01)

(58) Field of Classification Search
CPC .............. H04M 1/72448; G06F 1/1626; G06F 2200/1614; G06F 2200/1637
See application file for complete search history.

(56) References Cited

U.S. PATENT DOCUMENTS 9,524,036 B1 * 12/2016 Cassidy .................... G06F 1/32
11,494,994 B2 * 11/2022 Chen .......................... G06T 5/70
(Continued)

FOREIGN PATENT DOCUMENTS

CN    108491534 A    9/2018
CN    108671543 A    10/2018
(Continued)

OTHER PUBLICATIONS

Chinese Office Action for 2020115006792, dated Nov. 26, 2021.
(Continued)

*Primary Examiner* — Steven S Kelley
(74) *Attorney, Agent, or Firm* — Sughrue Mion, PLLC

(57) ABSTRACT

A human-computer interaction interface control method, apparatus, device and storage medium. The method includes: generating a virtual information carrier at a mobile terminal in response to a virtual information carrier generation instruction, the virtual information carrier being a virtual carrier for recording information; detecting state data of the mobile terminal, and matching the detected state data and preset target state data of the mobile terminal; determining, in response to the detected state data being matched with the preset target state data, that the mobile terminal is in a preset target state, and acquiring target movement data of the mobile terminal in the preset target state; analyzing (Continued)

the target movement data, and setting an interface control parameter of the mobile terminal automatically based on the target movement data; and controlling a human-computer interaction interface based on the interface control parameter to display the information recorded in the virtual information carrier.

19 Claims, 5 Drawing Sheets

(56)     References Cited

U.S. PATENT DOCUMENTS

| 2010/0066763 | A1* | 3/2010 | Macdougall | G06F 1/1626 |
| | | | | 345/656 |
| 2011/0161076 | A1* | 6/2011 | Davis | H04M 1/72448 |
| | | | | 704/E15.001 |
| 2011/0221664 | A1 | 9/2011 | Chen et al. | |
| 2012/0242664 | A1 | 9/2012 | Athans et al. | |
| 2014/0009389 | A1* | 1/2014 | Sugiura | G06F 1/1694 |
| | | | | 345/156 |
| 2016/0026249 | A1* | 1/2016 | Glass | G06Q 30/0621 |
| | | | | 715/702 |
| 2016/0198433 | A1* | 7/2016 | Fu | H04M 1/72448 |
| | | | | 455/458 |
| 2020/0225737 | A1* | 7/2020 | Limor | G06T 15/60 |
| 2020/0304706 | A1* | 9/2020 | He | A63F 13/525 |
| 2022/0050652 | A1* | 2/2022 | Heo | G09G 3/3406 |
| 2023/0321535 | A1* | 10/2023 | Xie | A63F 13/525 |

FOREIGN PATENT DOCUMENTS

| CN | 111221461 | A | 6/2020 |
| CN | 112612387 | A | 4/2021 |

OTHER PUBLICATIONS

International Search Report for PCT/CN2021/131126, dated Feb. 11, 2022.
Written Opinion for PCT/CN2021/131126, dated Feb. 11, 2022.

* cited by examiner

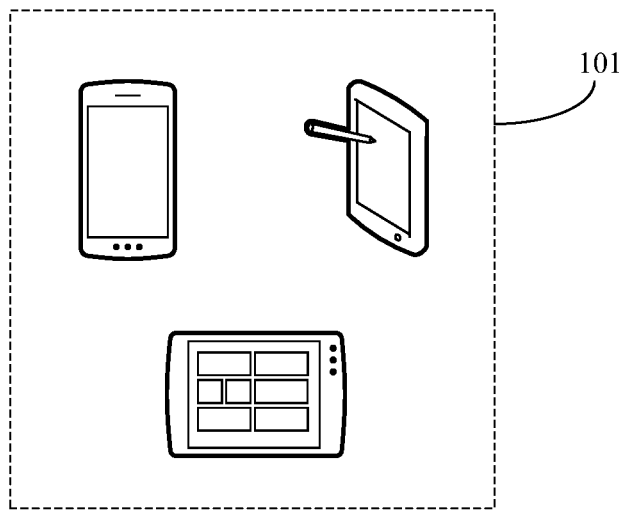

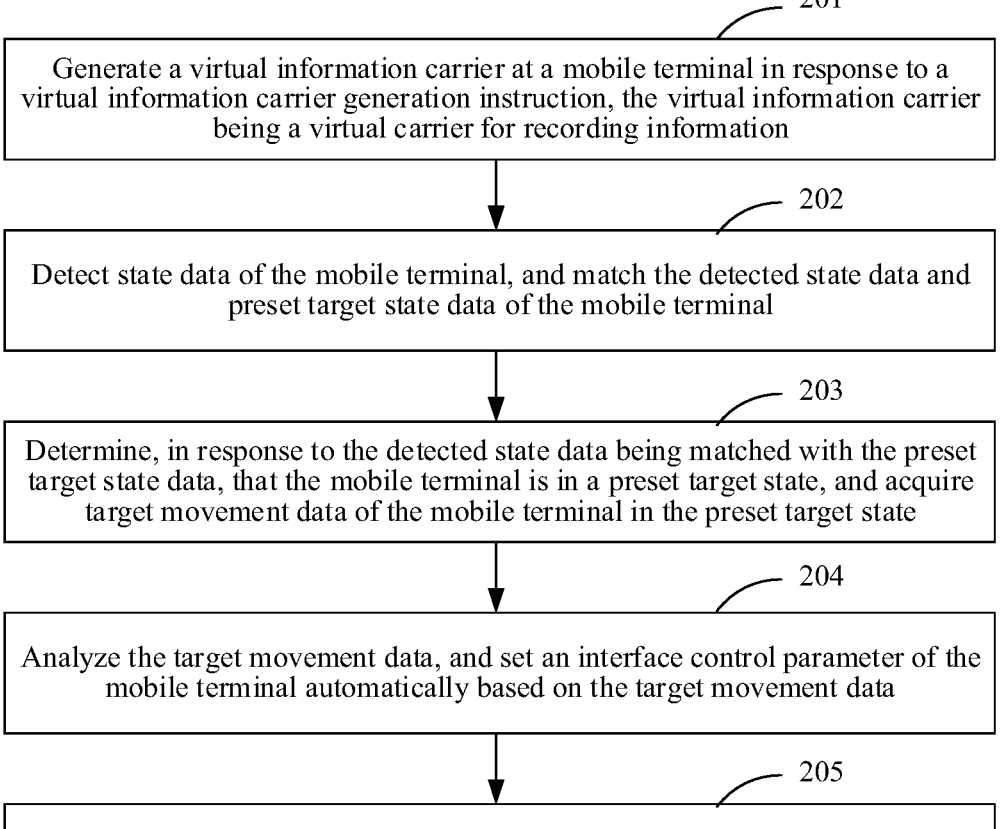

201

Generate a virtual information carrier at a mobile terminal in response to a virtual information carrier generation instruction, the virtual information carrier being a virtual carrier for recording information

202

Detect state data of the mobile terminal, and match the detected state data and preset target state data of the mobile terminal

203

Determine, in response to the detected state data being matched with the preset target state data, that the mobile terminal is in a preset target state, and acquire target movement data of the mobile terminal in the preset target state

204

Analyze the target movement data, and set an interface control parameter of the mobile terminal automatically based on the target movement data

205

Control a human-computer interaction interface based on the interface control parameter to display the information recorded in the virtual information carrier

FIG. 2

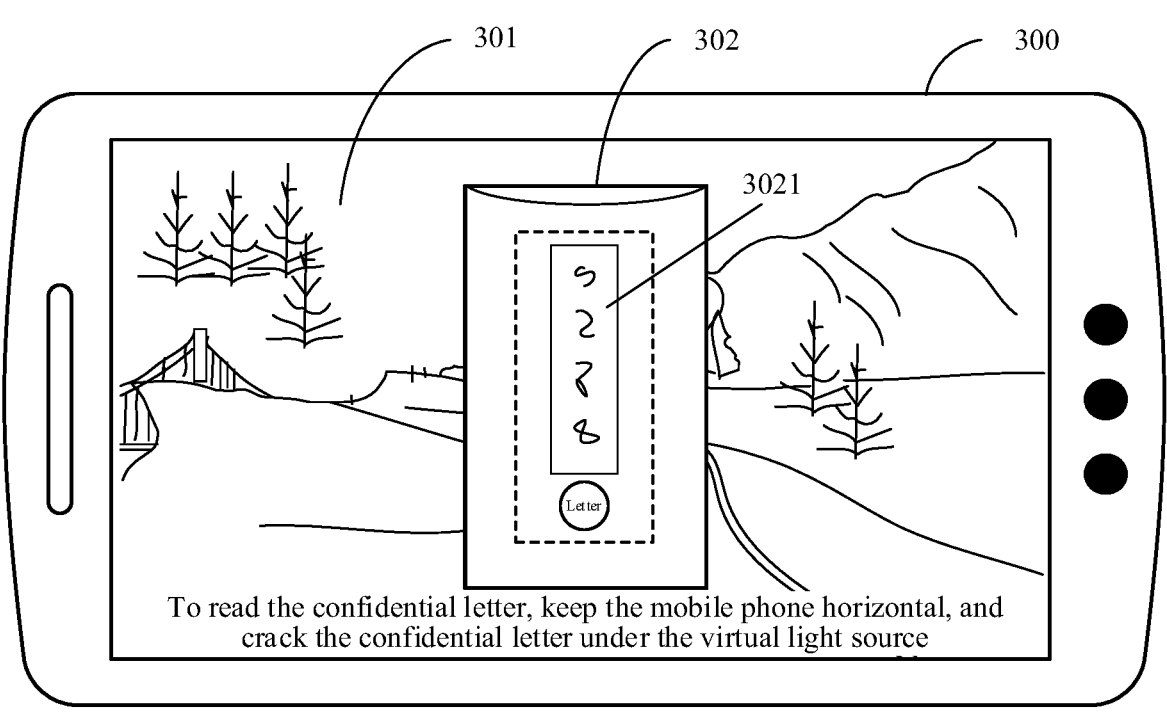
FIG. 3
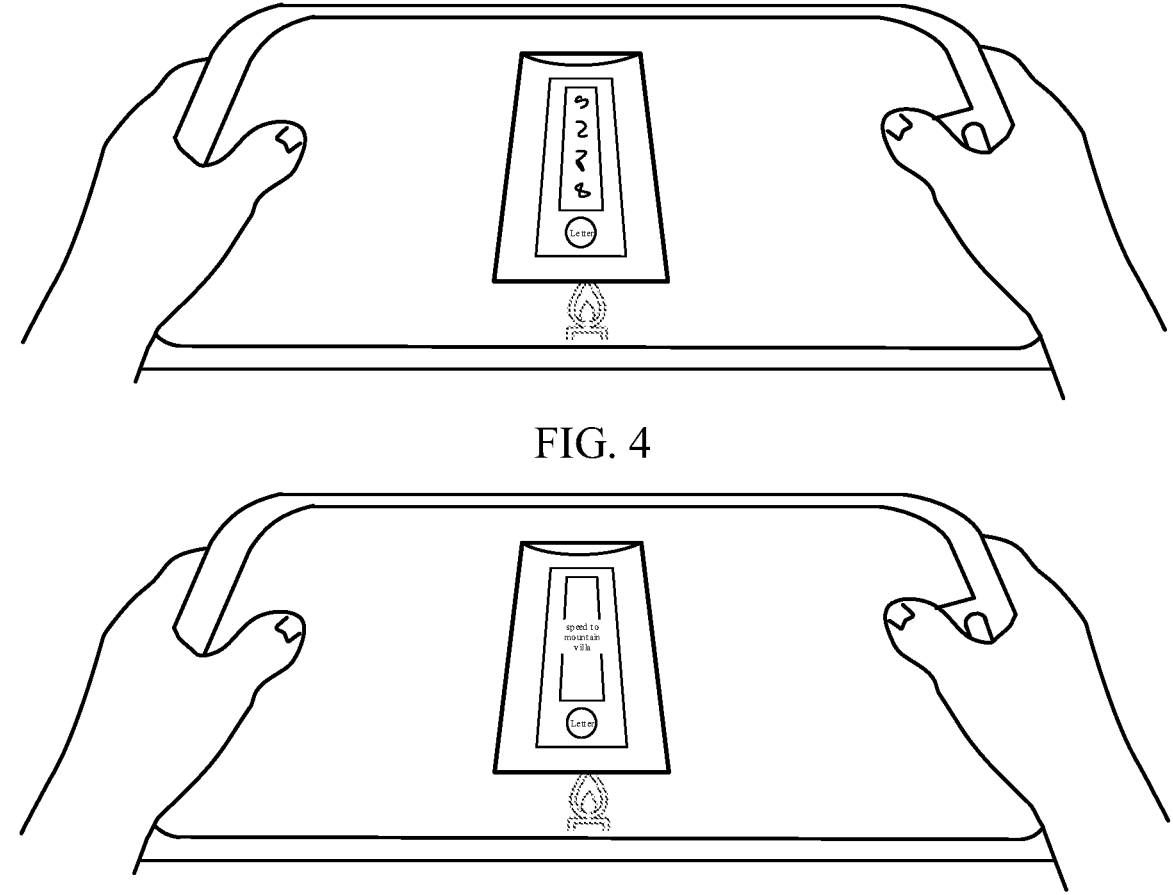
FIG. 4
FIG. 5

HUMAN-COMPUTER INTERACTION INTERFACE CONTROL METHOD AND APPARATUS, COMPUTER DEVICE, AND STORAGE MEDIUM

CROSS-REFERENCE TO RELATED APPLICATION(S)

This application is a continuation application of International Application No. PCT/CN2021/131126, filed on Nov. 17, 2021, which claims priority to Chinese Patent Application No. 202011500679.2 filed with the China National Intellectual Property Administration on Dec. 18, 2020, the disclosures of which are incorporated by reference in their entireties.

FIELD

The disclosure relates to the field of computer technology, and particularly to a human-computer interaction interface control method and apparatus, a device, and a storage medium.

BACKGROUND

With the development of computer technology, more and more applications may provide virtual information carriers (such as virtual letters) for interaction objects, and mobile terminals installed with such applications may display information (such as texts and images) recorded in the virtual information carriers for the interaction objects to view.

In the related art, information recorded in a virtual information carrier is usually displayed to a user as follows: a mobile terminal displays the information recorded in the virtual information carrier based on a trigger instruction of an interaction object for an information display control. In this manner, the mobile terminal is limited to display the information recorded in the virtual information carrier only according to the trigger instruction for the information display control. As a result, the human-computer interaction efficiency is relatively low, and the human-computer interaction effect is relatively poor.

SUMMARY

A human-computer interaction interface control method may be provided, performed by a mobile terminal, the method including: generating a virtual information carrier at the mobile terminal in response to a virtual information carrier generation instruction, the virtual information carrier being a virtual carrier for recording information; detecting state data of the mobile terminal, and matching the detected state data and preset target state data of the mobile terminal; determining, in response to the detected state data being matched with the preset target state data, that the mobile terminal is in a preset target state, and acquiring target movement data of the mobile terminal in the preset target state; analyzing the target movement data, and setting an interface control parameter of the mobile terminal automatically based on the target movement data; and controlling a human-computer interaction interface based on the interface control parameter to display the information recorded in the virtual information carrier.

A human-computer interaction interface control apparatus may be provided, including: a generation unit, configured to generate a virtual information carrier at a mobile terminal in response to a virtual information carrier generation instruction, the virtual information carrier being a virtual carrier for recording information; a detection unit, configured to detect state data of the mobile terminal, and match the detected state data and preset target state data of the mobile terminal; an acquisition unit, configured to determine, in response to the detected state data being matched with the preset target state data, that the mobile terminal is in a preset target state, and acquire target movement data of the mobile terminal in the preset target state; an analysis unit, configured to analyze the target movement data, and set an interface control parameter of the mobile terminal automatically based on the target movement data; and a control unit, configured to control a human-computer interaction interface based on the interface control parameter to display the information recorded in the virtual information carrier.

A computer device may be provided, including a memory and one or more processors, the memory storing computer-readable instructions, the computer-readable instructions, when executed by the one or more processors, causing the one or more processors to implement the human-computer interaction interface control method described above.

A non-transitory computer-readable storage medium may be provided, storing computer-readable instructions, the computer-readable instructions, when executed by one or more processors, causing the one or more processors to implement the human-computer interaction interface control method described above.

A computer program product or a computer program may be provided, including computer-readable instructions, the computer-readable instructions being stored in a computer-readable storage medium. A processor of a computer device reads the computer-readable instructions from the computer-readable storage medium, and executes the computer-readable instructions, to cause the computer device to perform the human-computer interaction interface control method described above.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

FIG. 1 is a schematic diagram of an implementation environment of a human-computer interaction interface control method according to some embodiments.

FIG. 2 is a flowchart of a human-computer interaction interface control method according to some embodiments.

FIG. 3 is a schematic diagram of a display interface of a mobile terminal according to some embodiments.

FIG. 4 is a schematic diagram of a display interface of another mobile terminal according to some embodiments.

FIG. 5 is a schematic diagram of a display interface of another mobile terminal according to some embodiments.

DESCRIPTION OF EMBODIMENTS

Figure 6:
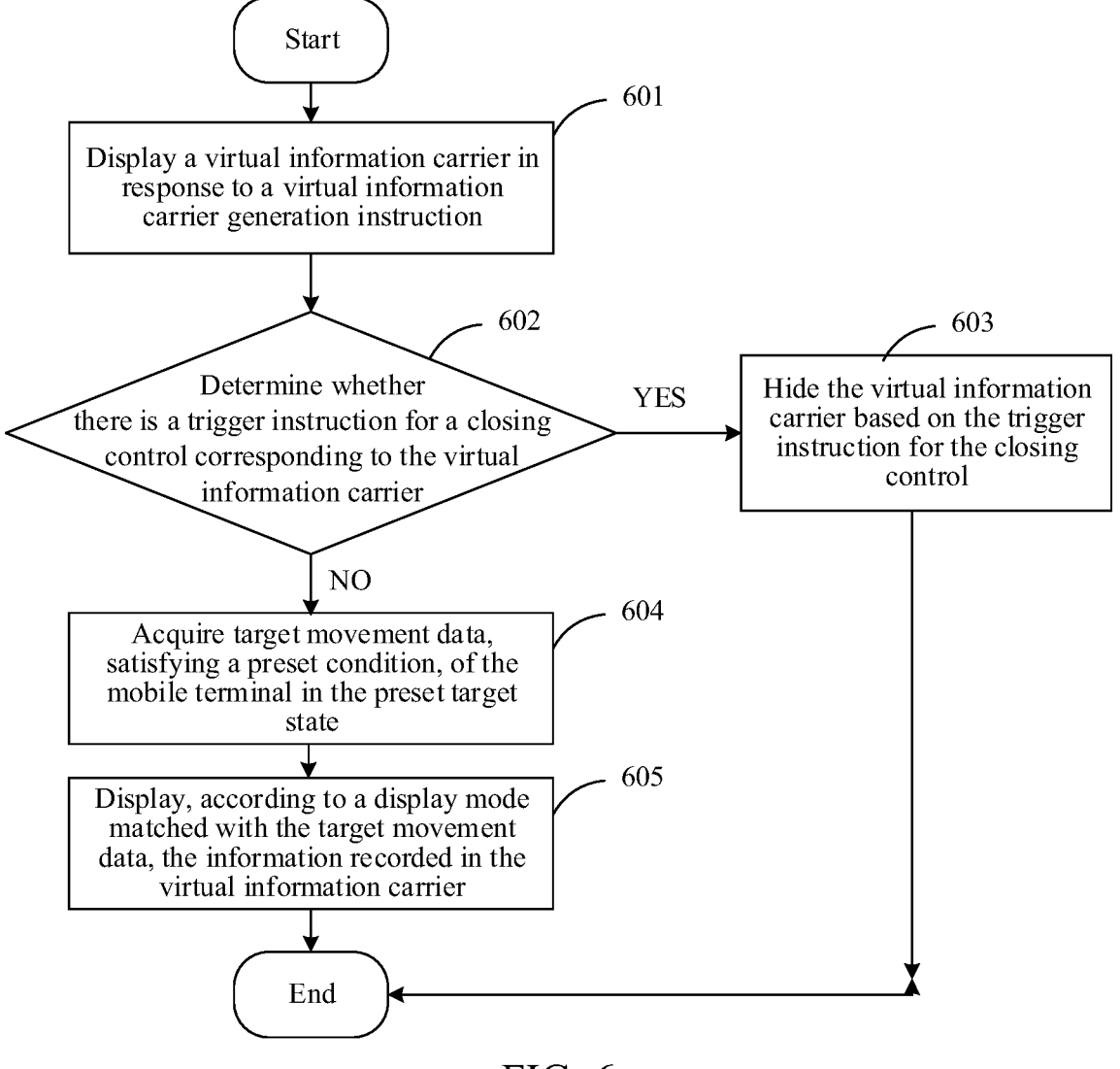
FIG. 6 is a schematic diagram of a process of displaying information recorded in a virtual information carrier according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

For ease of understanding the embodiments, some terms used in the embodiments are first explained below.

Virtual environment: Virtual environment is a two-dimensional virtual environment, a 2.5-dimensional virtual environment, or a three-dimensional virtual environment provided (or displayed) by an application program when run on a terminal. The virtual environment may be a simulated environment of a real world, or may be a semi-simulated semi-fictional environment, or may be an entirely fictional environment.

Virtual information carrier: it is a virtual carrier provided by an application to record information, such as a virtual letter, a virtual confidential letter, a virtual mail, and a virtual card.

Some embodiments provide a human-computer interaction interface control method. FIG. 1 shows a schematic diagram of an implementation environment of a human-computer interaction interface control method according to some embodiments. The implementation environment includes: a mobile terminal 101.

The mobile terminal 101 is installed with an application capable of providing a virtual information carrier. The mobile terminal 101 may display the virtual information carrier, or display information recorded in the virtual information carrier based on target movement data of the mobile terminal in a preset target state.

In some embodiments, a type of the application capable of providing the virtual information carrier is not limited. For example, the application capable of providing the virtual information carrier is a game application, a video application, a virtual reality (VR) application, an augmented reality (AR) application, a social application, an interactive entertainment application, etc.

The mobile terminal 101 is a movable terminal. In some embodiments, the mobile terminal 101 may be any mobile electronic product capable of performing human-computer interaction with an interaction object by one or more of a keyboard, a touchpad, a touch screen, a remote controller, voice interaction, a handwriting device, etc., such as a smartphone, a tablet computer, a personal digital assistant (PDA), a wearable device, a pocket personal computer (PPC), a Moving Picture Experts Group Audio Layer III (MP3) player, or a Moving Picture Experts Group Audio Layer IV (MP4) player.

A person skilled in the art is to understand that, the foregoing mobile terminal 101 is merely an example. Other existing mobile terminals or mobile terminals possibly appearing in future, if applicable to the disclosure, are also to fall within the protection scope of the disclosure and are included herein by reference.

Based on the implementation environment shown in FIG. 1, some embodiments provide a human-computer interaction interface control method. The method is described with application to a mobile terminal as an example. As shown in FIG. 2, the method provided in some embodiments includes the operations 201 to 205:

Operation 201: Generate a virtual information carrier at the mobile terminal in response to a virtual information carrier generation instruction, the virtual information carrier being a virtual carrier for recording information.

The virtual information carrier is a carrier provided by an application to record information. In some embodiments, a type of the application capable of providing the virtual information carrier is not limited. For example, the application capable of providing the virtual information carrier is a game application, a video application, a virtual reality (VR) application, an augmented reality (AR) application, a social application, an interactive entertainment application, etc. Representation forms of virtual information carriers provided by different types of applications may be different. No limits are made thereto. For example, the representation form of the virtual information carrier may be a rectangular envelope.

In some embodiments, a type of the information recorded in the virtual information carrier is not limited, and may change flexibly according to a practical application scenario. For example, the type of the information recorded in the virtual information carrier includes at least one of a text and an image. In addition, the role of the information recorded in the virtual information carrier may change flexibly according to the practical application scenario. However, no limits are made thereto. For example, if the application that provides the virtual information carrier is a game application, the role of the information recorded in the virtual information carrier may enable an interaction object to know about a subsequent game situation, or enable the interaction object to know about communication information, etc., transmitted by another interaction object to this interaction object.

The virtual information carrier that may be displayed in the mobile terminal may be automatically generated and transmitted by a backend server to the mobile terminal, or generated and transmitted by a mobile terminal of another interaction object to the mobile terminal, but is not limited thereto.

The virtual information carrier generation instruction is used for indicating that the virtual information carrier needs to be displayed. In some embodiments, a manner the mobile terminal acquires the virtual information carrier generation instruction includes, but not limited to, the following two.

The first manner: the mobile terminal acquires the virtual information carrier generation instruction based on a trigger operation of an interaction object over a virtual information carrier display control.

In the first manner, the mobile terminal passively acquires the virtual information carrier generation instruction based on an operation of the interaction object. The virtual information carrier display control is displayed on a display interface of the mobile terminal. In some embodiments, a form of the virtual information carrier display control is not limited. For example, the form of the virtual information carrier display control is a button, or a triggerable icon.

When the interaction object triggers the virtual information carrier display control, it indicates that the interaction object intends to view the virtual information carrier. In such case, the mobile terminal acquires the virtual information carrier generation instruction.

The second manner: the mobile terminal acquires the virtual information carrier generation instruction in response to a running process of the application satisfying a condition of automatically displaying the virtual information carrier.

The condition of automatically displaying the virtual information carrier may be set flexibly according to an actual situation of the application, but no limits are made thereto. For example, the condition of automatically displaying the virtual information carrier is that the application runs to a target scenario, the target scenario being a scenario whose implementation relies on the information recorded in the virtual information carrier. For example, the condition of automatically displaying the virtual information carrier is that the application receives the virtual information carrier. Alternatively, the condition of automatically displaying the virtual information carrier is that the application needs to use the virtual information in the virtual information carrier for subsequent control or processing of a virtual object.

When detecting that the running process of the application satisfies the condition of automatically displaying the virtual information carrier, the mobile terminal acquires the virtual information carrier generation instruction automatically. There may be one or more conditions of automatically displaying the virtual information carrier. No limits are made thereto. When there are multiple conditions of automatically displaying the virtual information carrier, the mobile terminal acquires the virtual information carrier generation instruction in response to the running process of the application satisfying any condition of automatically displaying a virtual information carrier.

No matter which manner is used, the mobile terminal generates the virtual information carrier after acquiring the virtual information carrier generation instruction. A display position of the virtual information carrier on the display interface of the mobile terminal may be set by experience, or adjusted flexibly according to the application scenario, but is not limited thereto. For example, the display position of the virtual information carrier on the display interface of the mobile terminal is in the center. Alternatively, the display position of the virtual information carrier on the display interface of the mobile terminal is in the left-center or the display position of the virtual information carrier on the display interface of the mobile terminal is in the right-center. Display positions of different virtual information carriers on the display interface of the mobile terminal may be the same or different. In this example embodiment, descriptions are made with only one virtual information carrier as an example.

In some embodiments, before the virtual information carrier is generated, a virtual environmental picture is displayed on the display interface of the mobile terminal. The virtual environmental picture is a rendered picture of a virtual environment provided by the application. In such case, the virtual information carrier is displayed as follows: the virtual display carrier is displayed on the virtual environmental picture. For example, as shown in FIG. 3, a virtual environmental picture 301 is displayed on a display interface of a mobile terminal 300, and a virtual information carrier 302 is displayed on the virtual environmental picture 301.

The mobile terminal does not display the information recorded in the virtual information carrier when displaying the virtual information carrier. When displaying the virtual information carrier, the mobile terminal occludes the information recorded in the virtual information carrier, or identifies the information recorded in the virtual information carrier with an encrypted character. For example, as shown by 3021 in FIG. 3, the mobile terminal identifies the information recorded in the virtual information carrier with an encrypted character when displaying the virtual information carrier.

The information recorded in the virtual information carrier may be distributed at a local position of the virtual information carrier, or in the whole virtual information carrier. No limits are made thereto. In some embodiments, when the virtual information carrier is displayed, a region for recording the information in the virtual information carrier may be highlighted, to facilitate the interaction between the interaction object and the mobile terminal and improve the human-computer interaction efficiency.

Operation 202: Detect state data of the mobile terminal, and match the detected state data and preset target state data of the mobile terminal.

Operation 203: Determine, in response to the detected state data being matched with the preset target state data, that the mobile terminal is in a preset target state, and acquire target movement data of the mobile terminal in the preset target state.

The state data is data capable of reflecting a state of the mobile terminal. The preset target state data is data that indicates that the mobile terminal is in a preset target state. After generating and displaying the virtual information carrier, the mobile terminal may detect the state data of the mobile terminal, and match the detected state data and the preset target state data of the mobile terminal, so as to determine whether the mobile terminal is in the preset target state.

The preset target state is a mobile terminal state needed to display the information recorded in the virtual information carrier. The target movement data is movement data of the mobile terminal in the preset target state. The target movement data refers to data generated in case of a positional change of the mobile terminal in the preset target state in a real space. The positional change of the mobile terminal in the preset target state in the real space may be controlled by the interaction object, or by another mobile device, but is not limited thereto.

Since the preset target state is a mobile terminal state needed to display the information recorded in the virtual information carrier, the target movement data of the mobile terminal in the preset target state is needed to control the displaying of the information recorded in the virtual information carrier. In some embodiments, after displaying the virtual information carrier, the mobile terminal monitors the state of the mobile terminal in real time, and after determining that the mobile terminal is in the preset target state, acquires the target movement data of the mobile terminal in the preset target state.

In some embodiments, the operation of detecting state data of the mobile terminal includes: collecting, by use of a first sensor configured in the mobile terminal, screen state data of the mobile terminal and an included angle between a screen of the mobile terminal and a horizontal plane or vertical plane; and obtaining the state data of the mobile terminal according to the screen state data and the included angle. Specifically, the process of monitoring the state of the mobile terminal is implemented by parsing the state data collected by a first sensor configured in the mobile terminal. That is, the state of the mobile terminal is monitored according to the state data collected by the first sensor configured in the mobile terminal. The first sensor is a sensor capable of collecting the state data of the mobile terminal in the mobile terminal. The state data is used for indicating the state of the mobile terminal. For example, the state data includes data for indicating a screen state (landscape, portrait, etc.) of the mobile terminal and data for indicating an included angle between a screen of the mobile terminal and a horizontal plane. In an example, the first sensor is a gyroscope sensor capable of collecting the state data of the mobile terminal. The screen state data is data that indicates the included angle between the screen of the mobile terminal and a plane where the screen is, and may be calculated based on a rotation speed, rotation direction, and rotation angular speed of the mobile terminal collected by the first sensor.

In some embodiments, the state data of the mobile terminal is collected by the first sensor, and the screen state data of the mobile terminal and the included angle between the mobile terminal and the horizontal plane or vertical plane are detected to rapidly and accurately determine whether the mobile terminal is in the preset target state suitable for viewing the information. Therefore, the condition that the interaction object views the information at an improper angle due to the fact that the mobile terminal yet not in the preset target state or in another state is determined to be in the preset target state suitable for viewing the information in the virtual information carrier is avoided, and the human-computer interaction efficiency for information viewing of the interaction object is improved.

In some embodiments, before the operation of acquiring target movement data of the mobile terminal in the preset target state, the method further includes: generating state prompting information about the mobile terminal in response to determining according to the detected state data that the mobile terminal is not in the preset target state; and generating direction prompting information about the mobile terminal in response to determining according to the detected state data that the mobile terminal is in the preset target state.

Specifically, the mobile terminal displays prompting information in addition to the virtual information carrier in response to the virtual information carrier generation instruction. The prompting information includes state prompting information for prompting the preset target state that the mobile terminal needs to be in to display the information recorded in the virtual information carrier. The prompting information further includes direction prompting information for prompting a target direction to which the mobile terminal in the preset target state needs to move to display the information recorded in the virtual information carrier. When it is determined according to the detected state data that the mobile terminal is not in the preset target state, the state prompting information about the mobile terminal is generated, and a human-computer interaction interface is controlled to display the state prompting information. When it is determined according to the detected state data that the mobile terminal is in the preset target state, the direction prompting information about the mobile terminal is generated, and the human-computer interaction interface is controlled to display the direction prompting information. Therefore, the interaction object may be prompted when appropriate when the interaction object operates the mobile terminal, to improve the smoothness of interaction between the interaction object and the mobile terminal.

The target direction is a direction to which the mobile terminal in the preset target state needs to move to display the information recorded in the virtual information carrier. For example, a movement direction of the mobile terminal involved in some embodiments is a direction of movement of the mobile terminal in the preset target state in the plane where the screen is. The target direction is set by experience, or adjusted flexibly according to a display situation of the virtual information carrier, and is not limited thereto.

As an example, if the preset target state is a state that the interaction object holds two sides of the mobile terminal with the left and right hands respectively to set the mobile terminal in a landscape and horizontal state, the target direction is a movement direction of the mobile terminal from back to front in case of simultaneous forward translation of the left and right hands of the interaction object; or, the target direction is a movement direction of the mobile terminal from front to back in case of simultaneous backward translation of the left and right hands of the interaction object; or, the target direction is a movement direction of the mobile terminal from right to left in case of simultaneous leftward translation of the left and right hands of the interaction object; or, the target direction is a movement direction of the mobile terminal from left to right in case of simultaneous rightward translation of the left and right hands of the interaction object.

In some embodiments, the target direction may be determined according to a display situation of the virtual information carrier. For example, if the virtual information carrier is shaped into a rectangle, the display situation of the virtual information carrier is that a long side of the virtual information carrier is parallel to a short side of the screen of the mobile terminal and a short side of the virtual information carrier is parallel to a long side of the screen of the mobile terminal. In such case, the target direction is a direction parallel to the long side of the virtual information carrier.

In some embodiments, the prompting information is used for only prompting the preset target state that the mobile terminal needs to be in to display the information recorded in the virtual information carrier. Alternatively, the prompting information is used for only prompting the target direction to which the mobile terminal in the preset target state needs to move to display the information recorded in the virtual information carrier. Alternatively, the prompting information is used for prompting both the preset target state that the mobile terminal needs to be in and the target direction to which the mobile terminal in the preset target state needs to move, to display the information recorded in the virtual information carrier. No limits are made thereto.

In some embodiments, in the case that the prompting information is used for prompting both the preset target state that the mobile terminal needs to be in and the target direction to which the mobile terminal in the preset target state needs to move, to display the information recorded in the virtual information carrier, there may be one or two pieces of prompting information. When there is only one piece of prompting information, the prompting information is used for prompting both the preset target state that the mobile terminal needs to be in and the target direction to which the mobile terminal in the preset target state needs to move, to display the information recorded in the virtual information carrier. When there are two pieces of prompting information, one of the two pieces of prompting information is used for prompting the preset target state that the mobile terminal needs to be in to display the information recorded in the virtual information carrier, and the other piece of prompting information is used for prompting the target direction to which the mobile terminal in the preset target state needs to move to display the information recorded in the virtual information carrier.

In some embodiments, in the case that there are two pieces of prompting information, the prompting information for prompting the preset target state that the mobile terminal needs to be in to display the information recorded in the virtual information carrier is referred to as state prompting information, and the prompting information for prompting the target direction to which the mobile terminal in the preset target state needs to move to display the information recorded in the virtual information carrier is referred to as direction prompting information.

The state prompting information may be displayed to notify the interaction object of the state that the mobile terminal needs to be in to display the information recorded in the virtual information carrier. If intending to display the information recorded in the virtual information carrier after seeing the displayed state prompting information, the interaction object determines whether a current state of the mobile terminal is the preset target state. If the current state of the mobile terminal is the preset target state, the state of the mobile terminal needs not to be adjusted. If the current state of the mobile terminal is not the preset target state, the mobile terminal needs to be adjusted to the preset target state. The direction prompting information may be displayed to notify the interaction object of further moving the mobile terminal in the preset target state to the target direction to view the information recorded in the virtual information carrier. After the interaction object adjusts the mobile terminal to the preset target state of the mobile terminal, and the mobile terminal in the preset target state is controlled to move to the target direction, the mobile terminal may be triggered to display the information recorded in the virtual information carrier. In this process, the human-computer interaction efficiency between the interaction object and the mobile terminal is improved.

In some embodiments, time of displaying the state prompting information and displaying the direction prompting information is not limited. The time of displaying the state prompting information includes, but not limited to, the following: the state prompting information is displayed automatically after the virtual information carrier is displayed; or, the state prompting information is displayed automatically while the virtual information carrier is displayed. The time of displaying the direction prompting information includes, but not limited to, the following: the direction prompting information is displayed automatically after the virtual information carrier is displayed; or, the direction prompting information is displayed automatically while the virtual information carrier is displayed; or, the direction prompting information is displayed after it is determined that the mobile terminal is in the preset target state.

For example, in some embodiments, a relationship between a display position of the state prompting information on the display interface and a display position of the virtual information carrier on the display interface is not limited. As an example, the display position of the state prompting information on the display interface is under the display position of the virtual information carrier on the display interface.

In some embodiments, a representation form of the direction prompting information is not limited. For example, the representation form of the direction prompting information is a text, or, the representation form of the direction prompting information is an arrowed direction icon.

In some embodiments, the state prompting information includes other prompting information, in addition to the information for indicating the preset target state. No limits are made thereto. For example, it is assumed that the virtual information carrier is a virtual confidential letter in a game application, the preset target state is a landscape and horizontal state, the mobile terminal is a mobile phone, and the process of displaying the information recorded in the virtual information carrier is a process of cracking and reading the virtual confidential letter. As shown in FIG. 3, in a case that the mobile phone is already in a landscape state, state prompting information "To read the confidential letter, keep the mobile phone horizontal, and crack the confidential letter under the virtual light source" is displayed under the virtual information carrier 302.

In an embodiment, the operation of acquiring target movement data of the mobile terminal in the preset target state includes: acquiring, in response to determining according to the state data collected by the first sensor configured in the mobile terminal that the mobile terminal is in the preset target state, the target movement data of the mobile terminal in the preset target state collected by a second sensor configured in the mobile terminal.

Specifically, after parsing the state data collected by the first sensor to analyze in real time whether the mobile terminal is in the preset target state, the mobile terminal acquires, in response to the state data collected by the first sensor indicating that the mobile terminal is in the preset target state, the target movement data of the mobile terminal in the preset target state collected by a second sensor configured in the mobile terminal. The second sensor is a sensor configured in the mobile terminal to collect movement data of the mobile terminal. After it is determined that the mobile terminal is in the preset target state, the movement data collected by the second sensor is the target movement data of the mobile terminal in the preset target state. The target movement data is movement data of the mobile terminal kept in the preset target state.

The second sensor may collect movement data. The movement data includes, but not limited to, data for indicating a movement direction, data for indicating a movement speed, etc. For example, the second sensor is an acceleration sensor configured in the mobile terminal. The acceleration sensor may detect an acceleration of the mobile terminal to analytically obtain the movement data of the mobile terminal.

In this embodiment, the target movement data collected by the sensor is acquired and analyzed not in all cases. Instead, only when it is determined that the mobile terminal is in the preset target state, the target movement data of the mobile terminal in the preset target state collected by the second sensor may further be acquired and analyzed to confirm a display mode of the information in the virtual information carrier. Therefore, the mobile terminal is prevented from acquiring the movement data in another state unsuitable for viewing the information, and unnecessary data processing and mobile terminal resource consumption are reduced.

In some embodiments, in a case that the display mode of the virtual information carrier is displaying the virtual information carrier on a virtual environmental picture, the method further includes: controlling the human-computer interaction interface to display the virtual information carrier and a virtual environmental picture; and controlling, in response to the mobile terminal being in the preset target state, the human-computer interaction interface to hide the virtual environmental picture and retain displaying of the virtual information carrier. Specifically, when the mobile terminal is in the preset target state, it indicates that the interaction object intends to view the information recorded in the virtual information carrier. In such case, the virtual environmental picture on the display interface of the mobile terminal is hidden, and the virtual information carrier is retained. By such changes of contents displayed on the display interface of the mobile terminal made by reducing the contents displayed on the display interface and only displaying the information recorded in the virtual information carrier, when to view the information may be prompted to a user. Therefore, the human-computer interaction efficiency between the interaction object and the mobile terminal is improved.

FIG. 4 is a schematic diagram of a display interface of another mobile terminal according to some embodiments. For example, it is assumed that the preset target state is a landscape and horizontal state, as shown in FIG. 4. When it is determined that the mobile terminal is in the landscape and horizontal state shown in FIG. 4, the virtual environmental picture on the display interface is hidden, and the virtual information carrier is retained, so as to highlight the virtual information carrier. In FIG. 4, the information recorded in the virtual information carrier is identified with an encrypted character. In FIG. 4, a virtual candle is also displayed on the display interface.

In some embodiments, when it is determined that the mobile terminal is in the preset target state, the virtual environmental picture may not be hidden. That is, if the mobile terminal is in the preset target state, the virtual environmental picture and the virtual information carrier are still retained. Virtual environmental pictures displayed on the display interface in different states of the mobile terminal may be the same or different. No limits are made thereto. In some embodiments, the display position of the virtual information carrier on the display interface remains unchanged as the state of the mobile terminal changes.

In some embodiments, a virtual light source may further be generated in the mobile terminal and displayed on the display interface of the mobile terminal, which is used for irradiating the virtual information carrier virtually. The virtual light source is displayed to present an interaction scenario of viewing the information recorded in the virtual information carrier under the virtual irradiation of the virtual light source to simulate information reading under the irradiation of a real light source. Therefore, the human-computer interaction efficiency between the interaction object and the mobile terminal is improved.

A type of the virtual light source is not limited. Different types of virtual light sources may irradiate the virtual information carrier virtually in different manners. For example, the virtual light source is a virtual candle or virtual floor light that irradiates the virtual information carrier virtually in the following manner: irradiating the virtual information carrier virtually from the bottom up. For example, the virtual light source is a virtual overhead light that irradiates the virtual information carrier virtually in the following manner: irradiating the virtual information carrier virtually from the top down.

For example, the virtual light source is an AR light source that simulates a real light source in a real world, whose position remains unchanged as the mobile terminal moves.

When the state of the mobile terminal and a position of the mobile terminal in a real space change, the virtual light source may be displayed on the display interface all the time, or may be displayed on the display interface in part of cases. This is related to the practical application scenario. No limits are made thereto.

Operation 204: Analyze the target movement data, and set an interface control parameter of the mobile terminal automatically based on the target movement data.

The interface control parameter is a parameter for controlling the human-computer interaction interface. Different interface control parameters may be used for controlling the human-computer interaction interface to display different interface contents. The interface control parameter includes a direction control parameter for controlling a direction of displaying the information in the virtual information carrier on the human-computer interaction interface, and may further include a speed control parameter for controlling a speed of displaying the information in the virtual information carrier on the human-computer interaction interface. The obtained target movement data of the mobile terminal in the preset target state is analyzed, and the interface control parameter of the mobile terminal is set automatically based on the target movement data.

In an embodiment, the preset target state is a basic condition needed to display the information recorded in the virtual information carrier. A further condition needed to display the information recorded in the virtual information carrier is that: the target movement data of the mobile terminal in the preset target state satisfies a preset condition. Therefore, after the target movement data of the mobile terminal in the preset target state is acquired, it is necessary to determine whether the target movement data satisfies the preset condition. The preset condition is used for limiting movement data capable of triggering the displaying of the information recorded in the virtual information carrier. The case that the target movement data satisfies the preset condition is set by experience, or adjusted flexibly according to the application scenario, and no limits are made thereto.

In some embodiments, whether the target movement data satisfies the preset condition is determined in the following manner: determining, in response to the target movement data indicating that the mobile terminal moves to the target direction in the preset target state, that the target movement data satisfies the preset condition; and determining, in response to the target movement data indicating that the mobile terminal moves to another movement direction except the target direction in the preset target state, that the target movement data does not satisfy the preset condition.

In some embodiments, the operation of analyzing the target movement data and setting an interface control parameter of the mobile terminal automatically based on the target movement data includes: acquiring subdata indicating a movement direction in the target movement data; matching the subdata indicating the movement direction and preset target directional data; determining, in response to the subdata indicating the movement direction being matched with the preset target directional data, that the mobile terminal moves to a target direction in the preset target state; and generating, based on the target direction during movement to the target direction in the preset target state, a direction control parameter for direction control over the information in the virtual information carrier.

For example, the target movement data includes subdata for indicating the movement direction. If the movement direction indicated by the subdata for indicating the movement direction in the target movement data is the target direction, it is determined that the target movement data indicates that the mobile terminal moves to the target direction on the plane where the screen is in the preset target state. After it is determined that the target movement data indicates that the mobile terminal moves to the target direction in the preset target state, a direction control parameter for direction control over the information in the virtual information carrier is generated based on the target direction during movement to the target direction in the preset target state.

The direction control parameter is a parameter for controlling a direction of displaying the information in the virtual information carrier on the human-computer interaction interface. For example, when the target direction is a movement direction of the mobile terminal from back to front in case of simultaneous forward translation of the left and right hands of the interaction object, the direction control parameter is used for controlling the human-computer interaction interface to display the information in the virtual information carrier from back to front sequentially. For example, when the target direction is a movement direction of the mobile terminal from front to back in case of simultaneous backward translation of the left and right hands of the interaction object, the direction control parameter is used for controlling the human-computer interaction interface to display the information in the virtual information carrier from front to back sequentially. For example, when the target direction is a movement direction of the mobile terminal from right to left in case of simultaneous leftward translation of the left and right hands of the interaction object, the direction control parameter is used for controlling the human-computer interaction interface to display the information in the virtual information carrier from right to left sequentially. For example, when the target direction is a movement direction of the mobile terminal from left to right in case of simultaneous rightward translation of the left and right hands of the interaction object, the direction control parameter is used for controlling the human-computer interaction interface to display the information in the virtual information carrier from left to right sequentially.

In this embodiment, after it is determined that the mobile terminal moves to the target direction in the preset target state, the direction control parameter for direction control over the information in the virtual information carrier may be generated based on the target direction to display the information in a manner of matching with the target direction of movement of the mobile terminal. Therefore, the impact of a mismatch between the display time and mode and the movement direction data of the mobile terminal in the preset target state on information viewing of the interaction object is avoided, and the smoothness of the human-computer interaction process as well as the human-computer interaction effect is improved.

In some embodiments, the target movement data may further include subdata for indicating a movement speed, in addition to the subdata for indicating the movement direction. In an embodiment, the method further includes: acquiring, during movement of the mobile terminal to the target direction in the preset target state, subdata indicating a movement speed in the target movement data, and determining, according to the subdata, the movement speed of the mobile terminal during movement to the target direction in the preset target state; comparing the movement speed with a preset speed range; and generating, based on the movement speed in response to the movement speed being within the preset speed range during movement to the target direction in the preset target state, a speed control parameter for speed control over the information in the virtual information carrier.

In an embodiment, it is determined, in response to the target movement data indicating that the mobile terminal moves to the target direction in the preset target state and a movement speed is within a preset speed range, that the target movement data satisfies the preset condition, and then the information recorded in the virtual information carrier is displayed. It is determined, in response to the target movement data indicating that the mobile terminal does not move to the target direction in the preset target state or in response to the target movement data indicating that the movement speed of the mobile terminal in the preset target state is beyond the preset speed range, that the target movement data satisfies the preset condition, and the information recorded in the virtual information carrier is not displayed.

The movement speed of the mobile terminal in the preset target state may be determined according to the subdata for indicating the movement speed in the target movement data. Then, the movement speed of the mobile terminal in the preset target state is compared with the preset speed range to determine whether the movement speed of the mobile terminal in the preset target state is within the preset speed range. A speed control parameter for speed control over the information in the virtual information carrier is generated based on the movement speed in response to the movement speed being within the preset speed range during movement to the target direction in the preset target state.

The speed control parameter is a parameter for controlling a speed of displaying the information in the virtual information carrier on the human-computer interaction interface. For example, the speed control parameter is a display speed of the information in the virtual information carrier. The display speed is positively correlated with the movement speed. That is, if the movement speed is higher, the display speed is higher. For example, a correspondence between a display speed and a movement speed is stored in the mobile terminal, a corresponding display speed is queried from the correspondence according to the movement speed of the mobile terminal in the preset target state indicated by the target movement data, and then the information recorded in the virtual information carrier is displayed gradually at the display speed.

In another embodiment, subdata in the target movement data may further include a movement acceleration for indicating a movement state of the mobile terminal in the preset target state. The preset speed range is set by experience, or adjusted flexibly according to the application scenario. No limits are made thereto.

In this embodiment, after it is determined that the mobile terminal moves to the target direction in the preset target state, the speed control parameter for speed control over the information in the virtual information carrier may be generated based on the movement speed to display the information in a manner of matching with the movement speed of the mobile terminal. Therefore, the impact of a mismatch between the display speed and the movement speed of the mobile terminal in the preset target state on information viewing of the interaction object is avoided, and the smoothness of the human-computer interaction process as well as the human-computer interaction effect is improved.

Operation 205: Control a human-computer interaction interface based on the interface control parameter to display the information recorded in the virtual information carrier.

After analytically obtaining the interface control parameter, the mobile terminal controls the human-computer interaction interface based on the interface control parameter to display, according to the display mode matched with the target movement data, the information recorded in the virtual information carrier. Displaying, according to the display mode matched with the target movement data, the information recorded in the virtual information carrier may provide for the interaction object the interaction experience of changing the state and movement direction of the mobile terminal to view the information recorded in the virtual information carrier. Therefore, the human-computer interaction efficiency between the interaction object and the mobile terminal is improved.

In some embodiments, the operation of generating, based on the target direction during movement to the target direction in the preset target state, a direction control parameter for direction control over the information in the virtual information carrier includes: based on the target direction during movement of the mobile terminal to the target direction in the preset target state, generating a control parameter for controlling the information recorded in the virtual information carrier to be displayed gradually according to the target direction, or, generating a control parameter for controlling the information recorded in the virtual information carrier to be displayed gradually according to a direction opposite to the target direction.

Specifically, a control parameter for controlling the information recorded in the virtual information carrier to be displayed gradually according to the target direction is generated during movement of the mobile terminal to the target direction so as to gradually display, according to a target display sequence matched with the target direction, the information recorded in the virtual information carrier. The target display sequence is used for ensuring that the information display direction is matched with the target direction. The information display direction is a direction from information displayed earlier to information displayed later. For example, that the information display direction is matched with the target direction refers to that: the information display direction is the target direction, or, the information display direction is a direction opposite to the target direction. No limits are made thereto. Since an interactive operation of the interaction object over the mobile terminal may control the mobile terminal to move gradually to the target direction, the mobile terminal may correspondingly display gradually, according to the display sequence matched with the target direction when detecting gradual movement to the target direction, the information recorded in the virtual information carrier. That is, the information is displayed along the movement direction of the mobile terminal in a manner of matching with the movement direction of the mobile terminal controlled by the interaction object. Therefore, time delay and data transmission resource waste caused by displaying in a wrong direction are avoided, and the human-computer interaction efficiency between the interaction object and the mobile terminal is improved.

In the process of gradually displaying, according to the target display sequence matched with the target direction, the information recorded in the virtual information carrier, new information displayed at certain time is related to the information recorded in the virtual information carrier and an actual situation of information that has been displayed. No limits are made thereto. For example, new information displayed at certain time is a line of words or a column of words, or, new information displayed at certain time is an or a half image.

Further, in the process of gradually displaying, according to the target display sequence matched with the target direction, the information recorded in the virtual information carrier, information displayed first does not disappear after being displayed, and remains on the display interface together with information that is being displayed, until the information recorded in the virtual information carrier is completely displayed. For example, as shown in FIG. 5, the information recorded in the virtual information carrier is "speed to mountain villa". In the process of displaying the information "speed to mountain villa" recorded in the virtual information carrier, "speed", "to", "mountain", and "villa" may be displayed gradually, or "villa", "mountain", "to", and "speed" may be displayed gradually. This is related to the actual situation.

In some embodiments, in the process of gradually displaying, according to the target display sequence matched with the target direction, the information recorded in the virtual information carrier, the display speed is related to the movement speed of the mobile terminal in the preset target state indicated by the target movement data. For example, the display speed is positively correlated with the movement speed. That is, if the movement speed is higher, the display speed is higher. A correspondence between a display speed and a movement speed is stored in the mobile terminal, a corresponding display speed is queried from the correspondence according to the movement speed of the mobile terminal in the preset target state indicated by the target movement data, and then the information recorded in the virtual information carrier is displayed gradually at the display speed according to the target display sequence.

Movement of the mobile terminal to the target direction refers to continuous movement. If the movement direction changes during movement, the process of displaying the information in the virtual information carrier is suspended.

In some embodiments, the operation of generating, based on the target direction during movement of the mobile terminal to the target direction in the preset target state, a control parameter for controlling the information recorded in the virtual information carrier to be displayed gradually according to the target direction includes:

changing gradually, according to the target direction during movement of the mobile terminal to the target direction in the preset target state, a virtual irradiation position on the virtual information carrier virtually irradiated by a virtual light source; acquiring a changed virtual irradiation position in real time; generating a first control parameter in response to the virtual irradiation position on the virtual information carrier being a first reference position, the first control parameter being used for controlling the human-computer interaction interface to display information recorded at the first reference position in the virtual information carrier; and generating a second control parameter in response to the virtual irradiation position on the virtual information carrier changing from the first reference position to a second reference position, the second control parameter being used for controlling the human-computer interaction interface to display information recorded at the second reference position in the virtual information carrier after the information at the first reference position is displayed.

The target direction is a movement direction of changing the virtual irradiation position on the virtual information carrier. The virtual irradiation position is a position irradiated virtually by the virtual light source. The first reference position is a position irradiated virtually first by the virtual light source. The second reference position is a next position irradiated virtually by the virtual light source after the first reference position. That is, during movement of the mobile terminal to the target direction, the virtual irradiation position on the virtual information carrier changes gradually, and every time when there is a new virtual irradiation position, information recorded at this new virtual irradiation position in the virtual information carrier is displayed immediately. In this manner, information recorded at positions irradiated virtually by the virtual light source in the virtual information carrier is displayed gradually based on interactive operations between the interaction object and the mobile terminal, to present an interaction process where the user may gradually view, in the movement direction of the mobile terminal, the information recorded in the virtual information carrier under the moving irradiation of the virtual light source rather than randomly view the information in a manner unrelated to the direction of the mobile terminal. Therefore, the human-computer interaction efficiency between the interaction object and the mobile terminal is improved.

In some embodiments, the virtual irradiation position on the virtual information carrier may be displayed with a different display effect from other positions, so as to prompt the interaction object about the position irradiated virtually by the virtual light source on the virtual information carrier. For example, the virtual irradiation position on the virtual information carrier is displayed with a special effect of irradiation by a light source. No matter whether the virtual light source is displayed on the display interface, the terminal may determine a position irradiated virtually by the virtual light source on the virtual information carrier, and further display the information recorded at this position in the virtual information carrier.

The process of displaying the information recorded in the virtual information carrier is shown in FIG. 6, including the following operations: Operation 601: Display a virtual information carrier in response to a virtual information carrier generation instruction. Operation 602: Determine whether there is a trigger instruction for a closing control corresponding to the virtual information carrier. If YES, namely the interaction object needs not to view information recorded in the virtual information carrier, the closing control corresponding to the virtual information carrier is clicked. In such case, the mobile terminal performs operation 603 to hide the virtual information carrier based on the trigger instruction for the closing control, namely exiting the process of displaying the information recorded in the virtual information process. If NO, namely the interaction object needs to view information recorded in the virtual information carrier, the mobile terminal is made in a preset target state and moved to a target direction. In such case, the mobile terminal performs operation 604 to acquire target movement data, satisfying a preset condition, of the mobile terminal in the preset target state, and performs operation 605 to display, according to a display mode matched with the target movement data, the information recorded in the virtual information carrier.

In some embodiments, when receiving a virtual information carrier (such as a virtual confidential letter) and needing to view information recorded in the virtual information carrier, the interaction object may use a more situated manner: the interaction object holds the mobile terminal with both hands to simulate movement of the mobile terminal over a virtual light source like a candle to gradually display the information recorded in the virtual information carrier as the mobile terminal moves under the virtual irradiation of the virtual light source. In this manner, more situated operation experience may be provided for the interaction object, funnier and richer human-computer interaction may be implemented, the sense of story atmosphere may be improved, and more enjoyable human-computer interaction experience may be provided for the interaction object. The method provided in some embodiments is applied extensively to games where situated operation experience needs to be improved, such as massive multiplayer online (MMO). An original ordinary and boring click mode is optimized into a design of great situated operation experience, so that the operation experience of the interaction object may be improved significantly, and the game is funnier.

In some embodiments, after the mobile terminal generates a virtual information carrier in response to a virtual information carrier generation instruction, the state of the mobile terminal changes based on an interactive operation of the interaction object over the mobile terminal. In this process, the mobile terminal detects state data, and matches the detected state data and preset target state data. Only when the detected state data is matched with the preset target state data, namely it is determined that the mobile terminal is in the preset target state suitable for the interaction object to view information, target movement data of the mobile terminal is further acquired to finally determine a display mode of the information in the virtual information carrier. Therefore, the mobile terminal is prevented from acquiring movement data in another state unsuitable for viewing the information, and unnecessary data processing and mobile terminal resource consumption are reduced. In addition, when it is determined that the mobile terminal is in the preset target state, target movement data of the mobile terminal in the preset target state is further acquired and analyzed, an interface control parameter of the mobile terminal is set automatically, and the human-computer interaction interface is controlled based on the interface control parameter to display the information recorded in the virtual information carrier rather than controlled immediately for displaying or controlled to randomly display the information recorded in the virtual information carrier. Therefore, the impact of a mismatch between display time and mode and the target movement data of the mobile terminal in the preset target state on information viewing of the interaction object is avoided, and the smoothness of the human-computer interaction process as well as the human-computer interaction effect is improved.

Although the operations in the flowcharts involved in the embodiments are displayed sequentially according to instructions of arrows, these operations are not necessarily performed sequentially according to a sequence instructed by the arrows. Unless otherwise explicitly specified in this specification, execution of the operations is not strictly limited, and the operations may be performed in other sequences. In addition, at least some operations in the flowcharts involved in the embodiments may include a plurality of operations or a plurality of operations. The operations or the stages are not necessarily performed at the same moment, but may be performed at different moments. The operations or the stages are not necessarily performed in sequence, but may be performed in turn or alternately with another operation or at least some of operations or stages of the another operation.

Figure 7:
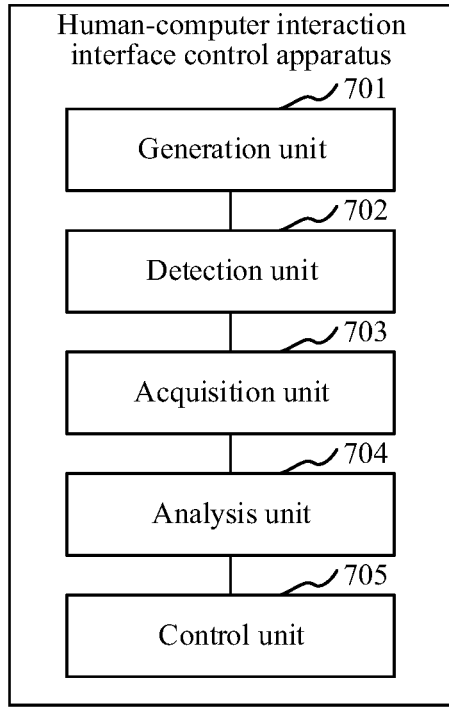
FIG. 7 is a schematic diagram of a human-computer interaction interface control apparatus according to some embodiments.

FIG. 7 shows a schematic diagram of a human-computer interaction interface control apparatus according to some embodiments, the apparatus, including:

a generation unit 701, configured to generate a virtual information carrier at a mobile terminal in response to a virtual information carrier generation instruction, the virtual information carrier being a virtual carrier for recording information;

a detection unit 702, configured to detect state data of the mobile terminal, and match the detected state data and preset target state data of the mobile terminal;

an acquisition unit 703, configured to determine, in response to the detected state data being matched with the preset target state data, that the mobile terminal is in a preset target state, and acquire target movement data of the mobile terminal in the preset target state;

an analysis unit 704, configured to analyze the target movement data, and set an interface control parameter of the mobile terminal automatically based on the target movement data; and a control unit 705, configured to control a human-computer interaction interface based on the interface control parameter to display the information recorded in the virtual information carrier.

In some embodiments, the detection unit 702 may be further configured to collect, by use of a first sensor configured in the mobile terminal, screen state data of the mobile terminal and an included angle between a screen of the mobile terminal and a horizontal plane or vertical plane; and generate the state data of the mobile terminal according to the screen state data and the included angle.

In some embodiments, the preset target state may include one or more of the following:

the mobile terminal is in a landscape state, and the included angle with the horizontal plane is a preset angle;

the mobile terminal is in a portrait state, and the included angle with the horizontal plane is a preset angle;

the mobile terminal is in a landscape state, and the included angle with the vertical plane is a preset angle; and the mobile terminal is in a portrait state, and the included angle with the vertical plane is a preset angle.

In some embodiments, the acquisition unit 703 may be further configured to acquire, in response to determining according to the state data detected by the first sensor configured in the mobile terminal that the mobile terminal is in the preset target state, the target movement data of the mobile terminal in the preset target state collected by a second sensor configured in the mobile terminal.

In some embodiments, the first sensor is a gyroscope sensor, and the second sensor is an acceleration sensor.

In some embodiments, the analysis unit 704 may be further configured to acquire subdata indicating a movement direction in the target movement data; match the subdata indicating the movement direction and preset target directional data; determine, in response to the subdata indicating the movement direction being matched with the preset target directional data, that the mobile terminal moves to a target direction in the preset target state; and generate, based on the target direction during movement to the target direction in the preset target state, a direction control parameter for direction control over the information in the virtual information carrier.

In some embodiments, in a case that the preset target state is that the mobile terminal is in a landscape state and an included angle with a horizontal plane is 0 degree, the target direction is one of the following:

a movement direction in which the mobile terminal is translational from back to front in the preset target state;

a movement direction in which the mobile terminal is translational from front to back in the preset target state;

a movement direction in which the mobile terminal is translational from right to left in the preset target state; and a movement direction in which the mobile terminal is translational from left to right in the preset target state.

In some embodiments, the analysis unit 704 may be further configured to acquire, during movement of the mobile terminal to the target direction in the preset target state, subdata indicating a movement speed in the target movement data, and determine, according to the subdata, the movement speed of the mobile terminal during movement to the target direction in the preset target state; compare the movement speed with a preset speed range; and generate, based on the movement speed in response to the movement speed being within the preset speed range during movement to the target direction in the preset target state, a speed control parameter for speed control over the information in the virtual information carrier.

Figure 8:
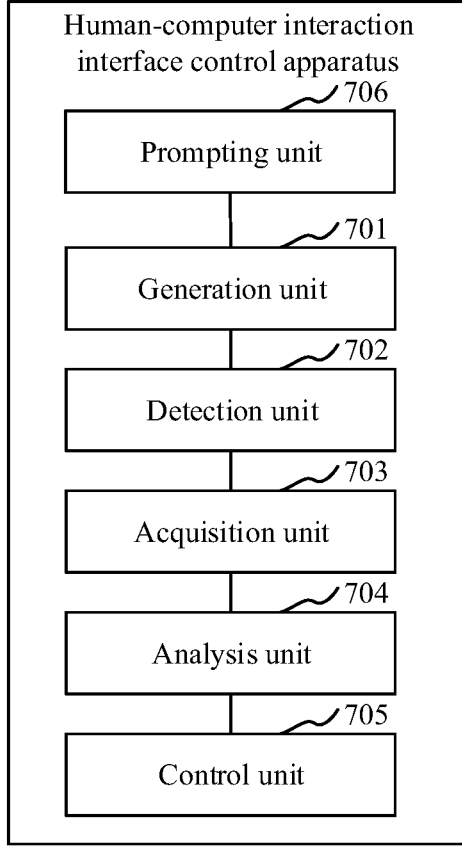
FIG. 8 is a schematic diagram of another human-computer interaction interface control apparatus according to some embodiments.

In some embodiments, referring to FIG. 8, the apparatus may further include:

a prompting unit 706, configured to generate state prompting information about the mobile terminal in response to determining according to the detected state data that the mobile terminal is not in the preset target state; and generate direction prompting information about the mobile terminal in response to determining according to the detected state data that the mobile terminal is in the preset target state.

In some embodiments, the analysis unit 704 may be further configured to, based on the target direction during movement of the mobile terminal to the target direction in the preset target state, generate a control parameter for controlling the information recorded in the virtual information carrier to be displayed gradually according to the target direction, or, generate a control parameter for controlling the information recorded in the virtual information carrier to be displayed gradually according to a direction opposite to the target direction.

In some embodiments, the analysis unit 704 may be further configured to change gradually, according to the target direction during movement of the mobile terminal to the target direction in the preset target state, a virtual irradiation position on the virtual information carrier virtually irradiated by a virtual light source; acquire a changed virtual irradiation position in real time; generate a first control parameter in response to the virtual irradiation position on the virtual information carrier being a first reference position, the first control parameter being used for controlling the human-computer interaction interface to display information recorded at the first reference position in the virtual information carrier; and generate a second control parameter in response to the virtual irradiation position on the virtual information carrier changing from the first reference position to a second reference position, the second control parameter being used for controlling the human-computer interaction interface to display information recorded at the second reference position in the virtual information carrier after the information at the first reference position is displayed.

In some embodiments, the generation unit 701 may be further configured to generate a virtual light source in the mobile terminal, the virtual light source being used for irradiating the virtual information carrier virtually.

In some embodiments, the control unit 705 may be further configured to control the human-computer interaction interface to display the virtual information carrier and a virtual environmental picture; and control, in response to the mobile terminal being in the preset target state, the human-computer interaction interface to hide the virtual environmental picture and retain displaying of the virtual information carrier.

In some embodiments, after the mobile terminal generates a virtual information carrier in response to a virtual information carrier generation instruction, the state of the mobile terminal changes based on an interactive operation of the interaction object over the mobile terminal. In this process, the mobile terminal detects state data, and matches the detected state data and preset target state data. Only when the detected state data is matched with the preset target state data, namely it is determined that the mobile terminal is in the preset target state suitable for the interaction object to view information, target movement data of the mobile terminal is further acquired to finally determine a display mode of the information in the virtual information carrier. Therefore, the mobile terminal is prevented from acquiring movement data in another state unsuitable for viewing the information, and unnecessary data processing and mobile terminal resource consumption are reduced. In addition, when it is determined that the mobile terminal is in the preset target state, target movement data of the mobile terminal in the preset target state is further acquired and analyzed, an interface control parameter of the mobile terminal is set automatically, and the human-computer interaction interface is controlled based on the interface control parameter to display the information recorded in the virtual information carrier rather than controlled immediately for displaying or controlled to randomly display the information recorded in the virtual information carrier. Therefore, the impact of a mismatch between display time and mode and the target movement data of the mobile terminal in the preset target state on information viewing of the interaction object is avoided, and the smoothness of the human-computer interaction process is improved.

When the apparatus provided in the foregoing embodiments implements functions of the apparatus, the division of the foregoing functional modules is merely an example for description. In the practical application, the functions may be assigned to and completed by different functional modules, or code, according to the requirements, that is, the internal structure of the device is divided into different functional modules, to implement all or some of the functions described above. In addition, the apparatus and method embodiments provided in the foregoing embodiments belong to the same conception. For the specific implementation process, reference may be made to the method embodiments.

Figure 9:
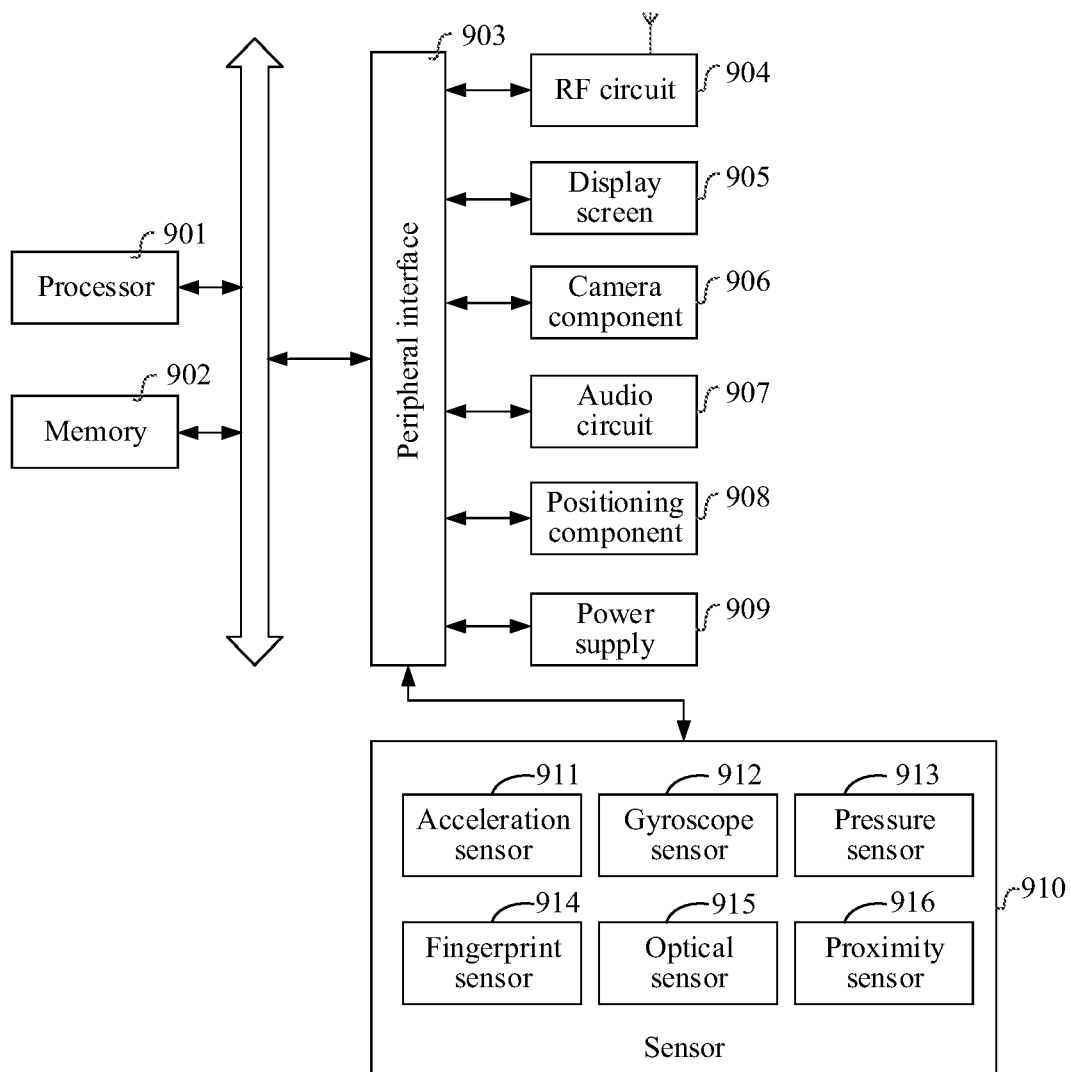
FIG. 9 is a schematic structural diagram of a mobile terminal according to some embodiments.

FIG. 9 is a schematic structural diagram of a computer device according to some embodiments. The computer device may be the mobile terminal 101 in FIG. 1. The mobile terminal may be: a smartphone, a tablet computer, a personal digital assistant (PDA), a wearable device, a pocket PC (PPC), a Moving Picture Experts Group Audio Layer III (MP3) player, or a Moving Picture Experts Group Audio Layer IV (MP4) player. The mobile terminal may be further referred to as other names such as user equipment and a portable terminal.

Generally, the mobile terminal includes: a processor 901 and a memory 902.

The processor 901 may include one or more processing cores such as a 4-core processor or an 8-core processor. The processor 901 may be implemented by using at least one hardware form of a digital signal processor (DSP), a field-programmable gate array (FPGA), and a programmable logic array (PLA). the processor 901 further includes a main processor and a coprocessor. The main processor is configured to process data in an active state, also referred to as a central processing unit (CPU). The coprocessor is a low power consumption processor configured to process data in a standby state. In some embodiments, the processor 901 may be integrated with a graphics processing unit (GPU). The GPU is configured to render and draw content that needs to be displayed on a display. In some embodiments, the processor 901 may further include an artificial intelligence (AI) processor. The AI processor is configured to process a computing operation related to machine learning.

The memory 902 may include one or more computer-readable storage media. The computer-readable storage media may be non-transitory. The memory 902 may further include a high-speed random access memory and a non-volatile memory, such as one or more magnetic disk storage devices or a flash storage device. In some embodiments, the non-transitory computer-readable storage medium in the memory 902 is configured to store at least one instruction, the at least one instruction being configured to be executed by the processor 901 to implement the human-computer interaction interface control method provided in the method embodiments.

In some embodiments, the mobile terminal may optionally include: a peripheral interface 903 and at least one peripheral device. The processor 901, the memory 902, and the peripheral device interface 903 may be connected by using a bus or a signal cable. Each peripheral device may be connected to the peripheral device interface 903 by using a bus, a signal line, or a circuit board. Specifically, the peripheral device includes: at least one of a radio frequency circuit (RF) 904, a display screen 905, a camera component 906, an audio circuit 907, a positioning component 908, and a power supply 909.

The peripheral interface 903 may be configured to connect at least one input/output (I/O)-related peripheral to the processor 901 and the memory 902. In some embodiments, the processor 901, the memory 902, and the peripheral interface 903 are integrated on the same chip or the same circuit board. In some other embodiments, any one or two of the processor 901, the memory 902, and the peripheral device interface 903 may be implemented on a separate chip or circuit board, which is not limited in this embodiment.

The RF circuit 904 is configured to receive and transmit a radio frequency (RF) signal, which is also referred to as an electromagnetic signal. The RF circuit 904 communicates with a communication network and another communication device by using the electromagnetic signal. The RF circuit 904 converts an electrical signal into an electromagnetic signal for transmission, or converts a received electromagnetic signal into an electrical signal. Optionally, the RF circuit 904 includes: an antenna system, an RF transceiver, one or more amplifiers, a tuner, an oscillator, a digital signal processor, a codec chipset, a user identity module card, and the like. The RF circuit 904 may communicate with other terminals by using at least one wireless communication protocol. The wireless communication protocol includes but is not limited to: a metropolitan area network, various generations of mobile communication networks (2G, 3G, 4G, and 5G), a wireless local area network, and/or a wireless fidelity (WiFi) network. In some embodiments, the RF circuit 904 may also include a circuit related to near field communication (NFC), which is not limited herein.

The display screen 905 is configured to display a user interface (UI). The UI may include a graph, a text, an icon, a video, and any combination thereof. When the display screen 905 is a touch display screen, the display screen 905 is further capable of collecting touch signals on or above a surface of the display screen 905. The touch signal may be inputted, as a control signal, to the processor 901 for processing. In this case, the display screen 905 may also be configured to provide virtual buttons and/or virtual keyboards, also referred to as soft buttons and/or soft keyboards. In some embodiments, there may be one display screen 905 disposed on a front panel of the mobile terminal. In some other embodiments, there may be at least two display screens 905, disposed on different surfaces of the mobile terminal respectively or in a folded design. In some other embodiments, the display screen 905 may be a flexible display screen arranged on a curved or folded surface of the mobile terminal. Even, the display screen 905 may be further set to have a non-rectangular irregular pattern, that is, a special-shaped screen. The display screen 905 may be prepared by using materials such as a liquid-crystal display (LCD), an organic light-emitting diode (OLED), or the like.

The camera component 906 is configured to capture images or videos. The camera component 906 may include a front-facing camera and a rear-facing camera. Generally, the front-facing camera is arranged on a front panel of the mobile terminal, and the rear-facing camera is arranged on a rear surface of the mobile terminal. In some embodiments, there are at least two rear-facing cameras, each being any one of a main camera, a depth-of-field camera, a wide-angle camera, and a telephoto camera, to achieve a background blurring function through fusion of the main camera and the depth-of-field camera, panoramic photo shooting and virtual reality (VR) shooting functions through fusion of the main camera and the wide-angle camera, or another fusion shooting function. In some embodiments, the camera component 906 may further include a flash. The flash may be a single color temperature flash or a double color temperature flash. The double color temperature flash refers to a combination of a warm light flash and a cold light flash, and may be used for light compensation under different color temperatures.

The audio circuit 907 may include a microphone and a speaker. The microphone is configured to collect sound waves of users and surroundings, and convert the sound waves into electrical signals and input the signals to the processor 901 for processing, or input the signals to the RF circuit 904 to implement voice communication. For the purpose of stereo sound acquisition or noise reduction, there may be a plurality of microphones, respectively disposed at different portions of the mobile terminal. The microphone may be alternatively a microphone array or an omnidirectional acquisition microphone. The speaker is configured to convert electrical signals from the processor 901 or the RF circuit 904 into sound waves. The speaker may be a conventional thin-film speaker or a piezoelectric ceramic speaker. When the speaker is the piezoelectric ceramic speaker, the speaker can not only convert an electric signal into sound waves audible to a human being, but also convert an electric signal into sound waves inaudible to the human being for ranging and other purposes. In some embodiments, the audio circuit 907 may further include an earphone jack.

The positioning component 908 is configured to position a current geographic location of the mobile terminal, to implement a navigation or a location based service (LBS). The positioning component 908 may be a positioning component based on a global positioning system (GPS) of the United States, a Beidou system of China, a Glonass system of Russia, or a Galileo system of the European Union.

The power supply 909 is configured to supply power to assemblies in the mobile terminal. The power supply 909 may be an alternating-current power supply, a direct-current power supply, a disposable battery, or a rechargeable battery.

In a case that the power supply 909 includes the rechargeable battery, the rechargeable battery may support wired charging or wireless charging. The rechargeable battery may also be configured to support fast charge technology.

In some embodiments, the mobile terminal further includes one or more sensors 910. The one or more sensors 910 include but are not limited to: an acceleration sensor 911, a gyroscope sensor 912, a pressure sensor 913, a fingerprint sensor 914, an optical sensor 915, and a proximity sensor 916.

The acceleration sensor 911 can detect acceleration sizes on three coordinate shafts of a coordinate system established based on the mobile terminal. For example, the acceleration sensor 911 may be configured to detect the components of gravitational acceleration on three coordinate axes. The processor 901 may control, according to a gravity acceleration signal collected by the acceleration sensor 911, the touch display screen 905 to display the UI in a landscape view or a portrait view. The acceleration sensor 911 may also be configured to collect game or user motion data.

The gyroscope sensor 912 may detect a body direction and a rotation angle of the mobile terminal, and the gyroscope sensor 912 may work with the acceleration sensor 911 to acquire a 3D action performed by the user on the mobile terminal. The processor 901 may implement the following functions according to the data collected by the gyroscope sensor 912: motion sensing (for example, change of the UI based on a tilt operation of the user), image stabilization during photographing, game control, and inertial navigation.

The pressure sensor 913 may be disposed at a side frame of the mobile terminal and/or a lower layer of the display screen 905. In a case that the pressure sensor 913 is disposed at the side frame of the mobile terminal, a holding signal of the user for the mobile terminal can be detected for the processor 901 to perform left and right hand recognition or quick operations according to the holding signal acquired by the pressure sensor 913. When the pressure sensor 913 is arranged on the lower layer of the display screen 905, the processor 901 controls an operable control on the UI interface according to a pressure operation of the user on the display screen 905. The operable control includes at least one of a button control, a scroll-bar control, an icon control, and a menu control.

The fingerprint sensor 914 is configured to collect a fingerprint of the user, and the processor 901 recognizes an identity of the user according to the fingerprint collected by the fingerprint sensor 914, or the fingerprint sensor 914 recognizes the identity of the user according to the collected fingerprint. When the identity of the user is recognized as credible, the processor 901 authorizes the user to perform a related sensitive operation. The sensitive operation includes unlocking a screen, viewing encrypted information, downloading software, paying, changing a setting, and the like. The fingerprint sensor 914 may be disposed on a front surface, a back surface, or a side surface of the mobile terminal. When a physical button or a vendor logo is disposed on the mobile terminal, the fingerprint sensor 914 may be integrated with the physical button or the vendor logo.

The optical sensor 915 is configured to collect ambient light intensity. In one embodiment, the processor 901 may control the display brightness of the display screen 905 according to the ambient light intensity collected by the optical sensor 915. Specifically, when the ambient light intensity is high, the display brightness of the display screen 905 is increased; and when the ambient light intensity is low, the display brightness of the display screen 905 is decreased.

In another embodiment, the processor 901 may further dynamically adjust a camera parameter of the camera component 906 according to the ambient light intensity acquired by the optical sensor 915.

The proximity sensor 916 is also referred to as a distance sensor and is generally disposed at the front panel of the mobile terminal. The proximity sensor 916 is configured to acquire a distance between the user and the front face of the mobile terminal. In an embodiment, when the proximity sensor 916 detects that the distance between the user and the front surface of the mobile terminal gradually becomes small, the display screen 905 is controlled by the processor 901 to switch from a screen-on state to a screen-off state. When the proximity sensor 916 detects that the distance between the user and the front surface of the mobile terminal gradually increases, the display screen 905 is controlled by the processor 901 to switch from the screen-off state to the screen-on state.

A person skilled in the art may understand that the structure shown in FIG. 9 does not constitute a limitation to the mobile terminal, and the mobile terminal may include more or fewer components than those shown in the figure, or some components may be combined, or a different component arrangement may be used.

In some embodiments, a computer device is further provided, including a processor and a memory, the memory storing at least one computer-readable instruction. The at least one computer-readable instruction is configured to be loaded and executed by one or more processors to implement any one of the human-computer interaction interface control method described above.

In some embodiments, a non-transitory computer-readable storage medium is provided, storing at least one computer-readable instruction, the at least one computer-readable instruction being loaded and executed by a processor of a computer device to implement any one of the human-computer interaction interface control method described above.

In a possible implementation, the computer-readable storage medium may be a read-only memory (ROM), a random access memory (random-access memory, RAM), a compact disc read-only memory (CD-ROM), a magnetic tape, a floppy disk, an optical data storage device, and the like.

In some embodiments, a computer program product or a computer program is provided, including computer-readable instructions, the computer-readable instructions being stored in a computer-readable storage medium. A processor of a computer device reads the computer-readable instructions from the computer-readable storage medium and executes the computer-readable instructions to cause the computer device to perform any one of the human-computer interaction interface control method described above.

The specification and claims of the disclosure, and terms "first" and "second" are used to distinguish similar objects, but are unnecessarily used to describe a specific sequence or order. It is to be understood that the data so used may be interchanged in an appropriate condition, so that the embodiments of the present disclosure described herein can be implemented in an order other than those illustrated or described herein. The implementations described in the foregoing embodiments do not represent all implementations that are consistent with the disclosure. Instead, they are merely examples of the apparatus and method according to some aspects of the disclosure as recited in the appended claims.

It is to be understood that "plurality of" mentioned in the specification means two or more. And/or describes an association relationship for describing associated objects and represents that three relationships may exist. For example, A and/or B may represent the following three cases: only A exists, both A and B exist, and only B exists. The character "I" generally indicates an "or" relationship between the associated objects.

The foregoing descriptions are merely examples of the embodiments of the disclosure, but are not intended to limit the disclosure. Any modification, equivalent replacement, or improvement made without departing from the spirit and principle of the disclosure shall fall within the protection scope of the disclosure.

What is claimed is:

1. A human-computer interaction interface control method, performed by a mobile terminal, the method comprising:

generating a virtual information carrier at the mobile terminal in response to a virtual information carrier generation instruction, the virtual information carrier being a virtual carrier for recording information;

detecting state data of the mobile terminal, and matching the detected state data and preset target state data of the mobile terminal;

determining, in response to the detected state data being matched with the preset target state data, that the mobile terminal is in a preset target state, and acquiring target movement data of the mobile terminal in the preset target state;

analyzing the target movement data, and setting an interface control parameter of the mobile terminal automatically based on the target movement data, the interface control parameter includes at least a direction control parameter that specifies a direction of sequentially displaying the information in the virtual information carrier on a human-computer interaction interface such that the information in the virtual information carrier is changed from being hidden to displayed sequentially in the specified direction;

changing gradually, according to a target direction during movement of the mobile terminal to the target direction in the preset target state, a virtual irradiation position on the virtual information carrier virtually irradiated by a virtual light source;

acquiring a changed virtual irradiation position in real time;

generating a first control parameter in response to the virtual irradiation position on the virtual information carrier being a first reference position, the first control parameter being used for controlling the human-computer interaction interface to display information recorded at the first reference position in the virtual information carrier;

generating a second control parameter in response to the virtual irradiation position on the virtual information carrier changing from the first reference position to a second reference position, the second control parameter being used for controlling the human-computer interaction interface to display information recorded at the second reference position in the virtual information carrier after the information at the first reference position is displayed; and controlling the human-computer interaction interface based on the interface control parameter to display the information recorded in the virtual information carrier.

2. The human-computer interaction interface control method according to claim 1, wherein the detecting state data comprises:

collecting, by use of a first sensor configured in the mobile terminal, screen state data of the mobile terminal and an included angle between a screen of the mobile terminal and a horizontal plane or vertical plane; and generating the state data of the mobile terminal according to the screen state data and the included angle.

3. The human-computer interaction interface control method according to claim 2, wherein the preset target state comprises one or more of the following:

the mobile terminal is in a landscape state, and the included angle with the horizontal plane is a preset angle;

the mobile terminal is in a portrait state, and the included angle with the horizontal plane is the preset angle;

the mobile terminal is in the landscape state, and the included angle with the vertical plane is the preset angle; and the mobile terminal is in the portrait state, and the included angle with the vertical plane is the preset angle.

4. The human-computer interaction interface control method according to claim 2, wherein the acquiring target movement comprises:

acquiring, in response to determining according to the state data detected by the first sensor configured in the mobile terminal that the mobile terminal is in the preset target state, the target movement data of the mobile terminal in the preset target state collected by a second sensor configured in the mobile terminal.

5. The human-computer interaction interface control method according to claim 4, wherein the first sensor is a gyroscope sensor, and the second sensor is an acceleration sensor.

6. The human-computer interaction interface control method according to claim 1, wherein the analyzing the target movement data and setting the interface control parameter comprises:

acquiring subdata indicating a movement direction in the target movement data;

matching the subdata indicating the movement direction and preset target directional data;

determining, in response to the subdata indicating the movement direction being matched with the preset target directional data, that the mobile terminal moves to the target direction in the preset target state; and generating, based on the target direction during movement to the target direction in the preset target state, the direction control parameter for direction control over the information in the virtual information carrier.

7. The human-computer interaction interface control method according to claim 6, wherein in a case that the preset target state is that the mobile terminal is in a landscape state and an included angle with a horizontal plane is 0 degree, the target direction is one of the following:

a movement direction in which the mobile terminal is translational from back to front in the preset target state;

a movement direction in which the mobile terminal is translational from front to back in the preset target state;

a movement direction in which the mobile terminal is translational from right to left in the preset target state; and a movement direction in which the mobile terminal is translational from left to right in the preset target state.

8. The human-computer interaction interface control method according to claim 6, further comprising:

acquiring, during movement of the mobile terminal to the target direction in the preset target state, subdata indicating a movement speed in the target movement data, and determining, according to the subdata, the movement speed of the mobile terminal during movement to the target direction in the preset target state;

comparing the movement speed with a preset speed range; and generating, based on the movement speed in response to the movement speed being within the preset speed range during movement to the target direction in the preset target state, a speed control parameter for speed control over the information in the virtual information carrier.

9. The human-computer interaction interface control method according to claim 1, before the acquiring target movement data, further comprising:

generating state prompting information about the mobile terminal in response to determining according to the detected state data that the mobile terminal is not in the preset target state; and generating direction prompting information about the mobile terminal in response to determining according to the detected state data that the mobile terminal is in the preset target state.

10. The human-computer interaction interface control method according to claim 6, wherein the generating the direction control parameter comprises:

based on the target direction during movement of the mobile terminal to the target direction in the preset target state, generating a control parameter for controlling the information recorded in the virtual information carrier to be displayed gradually according to the target direction, or, generating a control parameter for controlling the information recorded in the virtual information carrier to be displayed gradually according to a direction opposite to the target direction.

11. The human-computer interaction interface control method according to claim 10, further comprising:

generating the virtual light source in the mobile terminal, the virtual light source being used for irradiating the virtual information carrier virtually.

12. The human-computer interaction interface control method according to claim 1, further comprising:

controlling the human-computer interaction interface to display the virtual information carrier and a virtual environmental picture; and controlling, in response to the mobile terminal being in the preset target state, the human-computer interaction interface to hide the virtual environmental picture and retain displaying of the virtual information carrier.

13. A human-computer interaction interface control apparatus, comprising:

at least one memory configured to store program code; and at least one processor configured to read the program code and operate as instructed by the program code, the program code comprising:

generation code configured to cause the at least one processor to generate a virtual information carrier at a mobile terminal in response to a virtual information carrier generation instruction, the virtual information carrier being a virtual carrier for recording information;

detection code configured to cause the at least one processor to detect state data of the mobile terminal, and match the detected state data and preset target state data of the mobile terminal;

acquisition code configured to cause the at least one processor to determine, in response to the detected state data being matched with the preset target state data, that the mobile terminal is in a preset target state, and acquire target movement data of the mobile terminal in the preset target state;

analysis code configured to cause the at least one processor to analyze the target movement data, and set an interface control parameter of the mobile terminal automatically based on the target movement data, the interface control parameter includes at least a direction control parameter that specifies a direction of sequentially displaying the information in the virtual information carrier on a human-computer interaction interface such that the information in the virtual information carrier is changed from being hidden to displayed sequentially in the specified direction;

changing code configured to cause the at least one processor to change gradually, according to a target direction during movement of the mobile terminal to the target direction in the preset target state, a virtual irradiation position on the virtual information carrier virtually irradiated by a virtual light source;

acquiring code configured to cause the at least one processor to acquire a changed virtual irradiation position in real time;

first generating code configured to cause the at least one processor to generate a first control parameter in response to the virtual irradiation position on the virtual information carrier being a first reference position, the first control parameter being used for controlling the human-computer interaction interface to display information recorded at the first reference position in the virtual information carrier;

second generating code configured to cause the at least one processor to generate a second control parameter in response to the virtual irradiation position on the virtual information carrier changing from the first reference position to a second reference position, the second control parameter being used for controlling the human-computer interaction interface to display information recorded at the second reference position in the virtual information carrier after the information at the first reference position is displayed; and control code configured to cause the at least one processor to control the human-computer interaction interface based on the interface control parameter to display the information recorded in the virtual information carrier.

14. The human-computer interaction interface control apparatus according to claim 13, wherein the detection code is further configured to cause the at least one processor to:

collect, by use of a first sensor configured in the mobile terminal, screen state data of the mobile terminal and an included angle between a screen of the mobile terminal and a horizontal plane or vertical plane; and generate the state data of the mobile terminal according to the screen state data and the included angle.

15. The human-computer interaction interface control apparatus according to claim 14, wherein the acquisition code is further configured to cause the at least one processor to acquire, in response to determining according to the state data detected by the first sensor configured in the mobile terminal that the mobile terminal is in the preset target state, the target movement data of the mobile terminal in the preset target state collected by a second sensor configured in the mobile terminal.

16. The human-computer interaction interface control apparatus according to claim 13, wherein the analysis code is further configured to cause the at least one processor to:

acquire subdata indicating a movement direction in the target movement data;

match the subdata indicating the movement direction and preset target directional data;

determine, in response to the subdata indicating the movement direction being matched with the preset target directional data, that the mobile terminal moves to the target direction in the preset target state; and generate, based on the target direction during movement to the target direction in the preset target state, the direction control parameter for direction control over the information in the virtual information carrier.

17. The human-computer interaction interface control apparatus according to claim 16, wherein the analysis code is further configured to cause the at least one processor to:

acquire, during movement of the mobile terminal to the target direction in the preset target state, subdata indicating a movement speed in the target movement data, and determine, according to the subdata, the movement speed of the mobile terminal during movement to the target direction in the preset target state;

compare the movement speed with a preset speed range; and generate, based on the movement speed in response to the movement speed being within the preset speed range during movement to the target direction in the preset target state, a speed control parameter for speed control over the information in the virtual information carrier.

18. A non-transitory computer-readable storage medium, storing computer code that when executed by at least one processor causes the at least one processor to:

generate a virtual information carrier at a mobile terminal in response to a virtual information carrier generation instruction, the virtual information carrier being a virtual carrier for recording information;

detect state data of the mobile terminal, and match the detected state data and preset target state data of the mobile terminal;

determine, in response to the detected state data being matched with the preset target state data, that the mobile terminal is in a preset target state, and acquire target movement data of the mobile terminal in the preset target state;

analyze the target movement data, and set an interface control parameter of the mobile terminal automatically based on the target movement data, the interface control parameter includes at least a direction control parameter that specifies a direction of sequentially displaying the information in the virtual information carrier on a human-computer interaction interface such that the information in the virtual information carrier is changed from being hidden to displayed sequentially in the specified direction;

change gradually, according to a target direction during movement of the mobile terminal to the target direction in the preset target state, a virtual irradiation position on the virtual information carrier virtually irradiated by a virtual light source;

acquire a changed virtual irradiation position in real time;

generate a first control parameter in response to the virtual irradiation position on the virtual information carrier being a first reference position, the first control parameter being used for controlling the human-computer interaction interface to display information recorded at the first reference position in the virtual information carrier;

generate a second control parameter in response to the virtual irradiation position on the virtual information carrier changing from the first reference position to a second reference position, the second control parameter being used for controlling the human-computer interaction interface to display information recorded at the second reference position in the virtual information carrier after the information at the first reference position is displayed; and control the human-computer interaction interface based on the interface control parameter to display the information recorded in the virtual information carrier.

19. The non-transitory computer-readable storage medium according to claim 18, wherein the detect state data comprises:

collecting, by use of a first sensor configured in the mobile terminal, screen state data of the mobile terminal and an included angle between a screen of the mobile terminal and a horizontal plane or vertical plane; and generating the state data of the mobile terminal according to the screen state data and the included angle.

* * * * *